(12) United States Patent
Lund

(10) Patent No.: US 7,917,452 B2
(45) Date of Patent: *Mar. 29, 2011

(54) SYSTEM AND PROGRAM PRODUCT FOR OPTIMIZING USAGE BASED PRICING AND AVAILABILITY FOR A RESOURCE

(75) Inventor: Arnaud Lund, Cagens sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,776

(22) Filed: Apr. 28, 2010

(65) Prior Publication Data

US 2010/0211492 A1 Aug. 19, 2010

Related U.S. Application Data

(63) Continuation of application No. 11/120,709, filed on May 3, 2005, now Pat. No. 7,711,594.

(30) Foreign Application Priority Data

May 13, 2004 (FR) .................................. 04368041.2

(51) Int. Cl.
G06F 17/00 (2006.01)
G06F 9/46 (2006.01)
(52) U.S. Cl. .......................................... 705/400; 705/8
(58) Field of Classification Search .................. 705/400, 705/412, 7, 8, 9, 10, 29, 30, 32; 379/112.03, 379/112.04; 455/450
See application file for complete search history.

(56) References Cited

U.S. PATENT DOCUMENTS

| | | | |
|---|---|---|---|
| 6,240,287 B1 * | 5/2001 | Cheng et al. | 455/453 |
| 6,609,048 B2 | 8/2003 | Matsuo et al. | |
| 6,925,306 B2 * | 8/2005 | Obata et al. | 455/453 |
| 7,069,097 B1 | 6/2006 | Barto et al. | |
| 7,363,276 B2 | 4/2008 | Akiyama | |
| 7,574,384 B2 * | 8/2009 | Iida et al. | 705/28 |
| 2002/0152181 A1 | 10/2002 | Kanai et al. | |
| 2003/0224781 A1 | 12/2003 | Milford et al. | |

OTHER PUBLICATIONS

Notice of Allowance (Mail Date Dec. 16, 2009) for U.S. Appl. No. 11/120,709, filed May 3, 2005; Confirmation No. 3925.

* cited by examiner

*Primary Examiner* — Igor Borissov
(74) *Attorney, Agent, or Firm* — Schmeiser, Olsen & Watts; Arthur J. Samodovitz

(57) ABSTRACT

A system and program product for determining a price "P" to bill a customer for a resource. Amounts "U" and "$C_i$" of the resource provided and committed, respectively, to the customer during the billing period are determined. The price $P=F(C_i)+G(U-C_i)$ is determined and billed to the customer, where "F" and "G" are price functions for the resource. Determined is the number of requests for the resource made by the customer during the billing period in excess of "$C_i$" which were denied. If the number of denied requests exceeds a predetermined threshold, the amount "$C_i$" for determining the price "P" is increased during a subsequent billing period. The price "P" is billed to the customer for the subsequent billing period based on the increased amount "$C_i$" and the value "U" during the subsequent billing period, and the functions "F" and "G".

20 Claims, 2 Drawing Sheets

SYSTEM AND PROGRAM PRODUCT FOR OPTIMIZING USAGE BASED PRICING AND AVAILABILITY FOR A RESOURCE

This application is a continuation application claiming priority to Ser. No. 11/120,709, filed May 3, 2005.

BACKGROUND

The present invention relates generally to pricing of resources used by a customer, and more particularly to a technique to optimize resource pricing and availability for the customer.

It is known to charge a customer based on the customer's amount of usage of a resource such as disk space, bandwidth and processor utilization in the computer and telecommunication fields and energy in other fields. It was also known to charge a basic service fee for a predetermined, guaranteed amount of resource availability, and then add a usage fee for additional consumption. The resource provider does not guarantee that a customer request for the additional resource consumption can be satisfied, and typically charges less per unit of additional, not-guaranteed resource than unit of guaranteed resource. It was known for a contract to specify and fix the basic fee, amount of guaranteed resource availability, and usage fee for additional resource consumption. Also, some contracts may limit the total amount of resources that the customer may consume. Occasionally, the fee arrangement is not optimum for the customer and/or does not meet the customer's needs.

The following describes known techniques to determine a bill for a customer based on the customer's resource utilization. The resource provider uses a known technique to measure the customer's resource utilization at defined sampling intervals. The measured/sample values "$U_n$" of resource utilization or consumption at the measurement or sampling intervals can be denoted by ($U_1, U_2, \ldots U_n$). (If the measurement interval is very small, this will appear to be a "continuous" measurement). At the end of the billing period, the samples are compiled to determine a final usage value for the entire billing period. The final usage value denoted as "U" for a billing period can be determined based on an equation $U=M (U_1, U_2, \ldots U_n)$. The function "M" depends on the contract with the customer and can be the average of the sample utilization values "$U_i$", the sum of the sample utilization values "$U_i$", the (upper) 95th percentile sample utilization value, etc.

Typically the contract between the customer and the resource provider specifies an amount of resource which the resource provider guarantees or commits to the customer. The contract may also specify an absolute maximum amount of resource that the customer can request from the resource provider. In some cases, the customer may request an amount of resource greater than the amount guaranteed in the contract. Typically, the resource provider will supply this additional amount if it does not exceed the absolute maximum specified in the contract and if this additional amount is available. The situation where the resource provider cannot or will not satisfy a request by a customer for an amount of resource can be represented by the following. If the values of these customer resource requests at each measurement interval are $R_1, R_2, \ldots R_n$, then, for any measure interval $U_i \leq R_i$.

One reason the resource provider may not provide the requested additional resource is that the resource provider's total resources may be shared amongst multiple customers, and the customers may be compete with each other for the available resources in excess of their guaranteed amount, if any. For example, in a data processing environment multiple customers may use a common pool of servers, and in a telecommunications environment multiple customers may use a common pool of communication equipment. Thus, $U_i < R_i$ when there are not enough resources available at one time to satisfy all requests of all customers, even though $R_i \leq K$, where "K" represents the total pooled amount of resources. If the contract with a customer includes a committed or guaranteed minimum value, any customer request at or below this guaranteed minimum value at any time will be satisfied regardless of requests made by other customers at the same time. Therefore, any customer request at or below this guaranteed minimum value at any time will be satisfied regardless of requests made by other customers at the same time. This committed minimum value can be denoted "C" in the following equations:

$C \leq K$

If $R_i \leq C$, then the request $R_i$ is always satisfied and $U_i = R_i$,
If $C < R_i \leq K$, then the request $R_i$ is not always satisfied and $C \leq U_i \leq R_i \leq K$,
If $K < R_i$ then the request $R_i$ is not completely satisfied and $C \leq U_i \leq K < R_i$.

At the end of the billing period, "U" is computed with the equation $U=M (U_1, U_2, \ldots U_n)$. The price to be paid by the customer is the sum of two pricing elements: (i) the price for a certain amount of committed or guaranteed resource which is a function depending on "C", i.e. F(C), and (ii) the usage price paid for consumption of the resource above the committed level. This is a fraction of the (excess) resource consumed for which the availability has not been guaranteed. In other words, the charge for the uncommitted resource should be less than the charge for the committed resource, per unit of consumption, because of the risk that the uncommitted resource will not be provided. This price is therefore a function of U−C, i.e. G(U−C). "F" and "G" are monotonicaly increasing functions, and G(x)=0 if x≤0. Thus, the function "G" applies to a fraction of the resource which is not committed. In other words:

$F(C+x)+G(U-(C+x))>F(c)+G((U+x)-C)$ where "x" represents a small increase. The price for (a modest amount of) extra consumption is less than the price for the same increase of the committed amount of resource.

Typically, the resource provider requires that the customer select a committed amount "C" from a predetermined, discrete set of committed values ($C_1, C_2, \ldots C_n$). For example, a committed value of a subscription for electric service may be limited to predetermined, discrete values such as $C_1=3$ kWh, $C_2=6$ kWh, $C_3=9$ kWh, etc. Therefore, the price can be defined by the equation:

$P=F(C_i)+G(U-C_i)$ where $C_i$ is the committed value selected by the customer from the set of values $C_1, C_2, \ldots C_n$.

While the foregoing techniques to determine a fee to charge a customer for use of a resource are effective, these techniques are not always optimum for the customer.

Accordingly, an object of the present invention is to optimize, for the customer, a contract for resource consumption.

Another object of the present invention is to dynamically optimize, for the customer, the contract for resource consumption.

SUMMARY OF THE INVENTION

The present invention resides in a system, method and program product for determining a price "P" to bill a customer for a resource. An amount "U" of the resource provided to the customer during the billing period is determined. An amount "$C_i$" of the resource committed to the customer during the billing period is identified. The price $P=F(C_i)+G(U-C_i)$ is determined, where "F" and "G" are price functions for the resource. The price "P" is billed to the customer for the billing period. A determination is made as to the number of requests for the resource which were made by the customer during the billing period in excess of "$C_i$" which were denied. If the number of denied requests exceeds a predetermined threshold, the amount "$C_i$" for determining the price "P" is increased during a subsequent billing period. The price "P" is billed to the customer for the subsequent billing period based on the increased amount "$C_i$" and the value "U" during the subsequent billing period, and the functions "F" and "G".

In accordance with a feature of the present invention, a determination is made if the customer requested significantly less resource than "$C_i$" during the billing period. If so, the amount "$C_i$" is decreased for determining the price "P" during the subsequent billing period. The price "P" is billed to the customer for the subsequent billing period based on the decreased amount "$C_i$" and the value "U" during the subsequent billing period, and the functions "F" and "G".

DETAILED DESCRIPTION OF THE PREFERRED EMBODIMENTS

Figure 1:
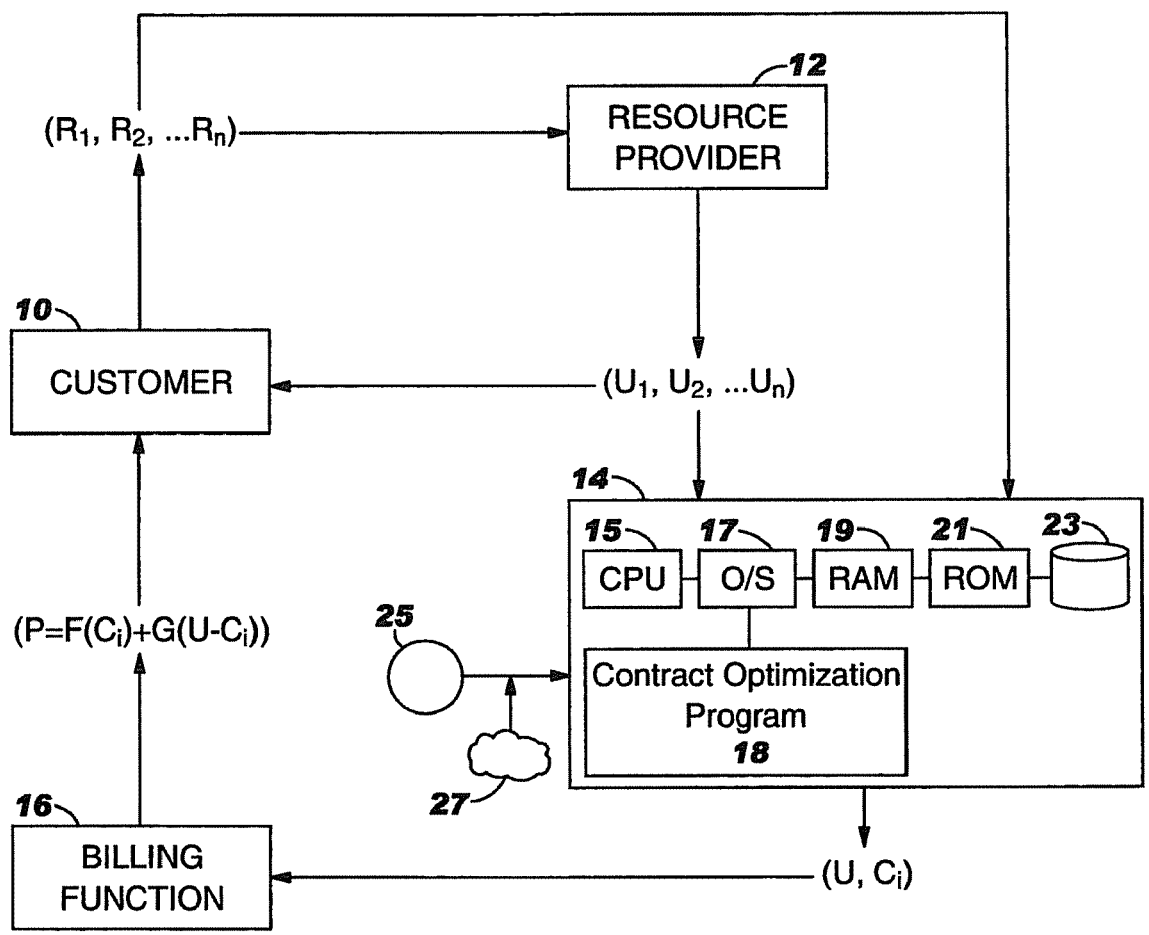
FIG. 1 is a block diagram of a distributed system incorporating the present invention.

The implementation of the present invention includes a known technique to measure consumption of a resource such as disk space, bandwidth and processor utilization in the computer and telecommunication fields and energy in other fields. The measurement is typically performed at regular (sample) time intervals, during a billing period. Typically, the sample interval is sufficiently short so that the samples, over time, accurately represent the total usage. For example, the measurement can be performed every five minutes during a billing period of a month.

The measured/sample values "$U_n$" of resource utilization or consumption at measurement intervals can be denoted by $(U_1, U_2, \ldots U_n)$. At the end of the billing period, the samples are compiled to determine a final usage value for the entire billing period. The final usage value denoted as "U" for a billing period can be determined based on an equation $U=M(U_1, U_2, \ldots U_n)$. The function "M" depends on the contract with the customer and can be the average of the sample utilization values "$U_i$", the sum of the sample utilization values "$U_i$", the (upper) 95th percentile sample utilization value, etc.

To best utilize the present invention, the contract between the customer and the resource provider specifies an amount of resource which the resource provider guarantees or commits to the customer. The contract may also specify an absolute maximum amount of resource that the customer can request from the resource provider. In some cases, the customer may request an amount of resource greater than the amount guaranteed in the contract. Typically, the resource provider will supply this additional amount if it does not exceed the absolute maximum specified in the contract and if this additional amount is currently available. In one environment where the present invention can be used, there are a pool of resources shared by multiple customers, and the availability of the resource for a customer above the customer's guaranteed amount depends on the current utilization of the other customers. The situation where the resource provider cannot or will not satisfy a request by a customer for an amount of resource can be represented by the following. If the values of these customer resource requests at each measurement interval are $R_1, R_2, \ldots R_n$, then, for any measure interval $U_i \leq R_i$. Thus, $U_i < R_i$ when there are not enough resources available at one time to satisfy all requests of all customers, even though $R_i \leq K$, where "K" represents the total pooled amount of resources. If the contract with a customer includes a committed or guaranteed minimum value, any customer request at or below this guaranteed minimum value at any time will be satisfied regardless of requests made by other customers at the same time. This committed minimum value can be denoted "C" in the following equations:

$C \leq K$

If $R_i \leq C$, then the request $R_i$ is always satisfied and $U_i = R_i$,
If $C < R_i \leq K$, then the request $R_i$ is not always satisfied and $C \leq U_i \leq R_i \leq K$,
If $K < R_i$, then the request $R_i$ is not completely satisfied and $C \leq U_i \leq K < R_i$.

At the end of the billing period, "U" is computed with the equation $U = M(U_1, U_2, \ldots U_n)$. The price to be paid by the customer is the sum of two pricing elements: (i) the price for a certain amount of committed or guaranteed resource which is a function depending on "C", i.e. F(C), and (ii) the usage price paid for consumption of the resource above the committed level. This is a fraction of the (excess) resource consumed for which the availability has not been guaranteed. In other words, the charge for the uncommitted resource is less than the charge for the committed resource, per unit of consumption, because of the risk that the uncommitted resource will not be provided. This price is therefore a function of $U-C$, i.e. $G(U-C)$. "F" and "G" are monotonically increasing functions, and $G(x)=0$ if $x \leq 0$. The function "G" applies to a fraction of the resource which is not committed. In other words:

$$F(C+x)+G(U-(C+x))>F(c)+G((U+x)-C)$$

where "x" represents a small increase. The price for (a modest amount of) extra consumption above the committed amount is less than the price for the same increase of the committed amount of resource.

Preferably, the resource provider requires that the customer select a committed amount "C" from a predetermined, discrete set of committed values $(C_1, C_2, \ldots C_n)$. For example, a committed value of a subscription for electric service may be limited to predetermined, discrete values such as $C_1=3$ kWh, $C_2=6$ kWh, $C_3=9$ kWh, etc. Therefore, the price "P" can be defined by the equation:

$$P=F(C_i)+G(U-C_i)$$

where "$C_i$" is the committed value selected by the customer from the set of values $C_1, C_2, \ldots C_n$.

In accordance with the present invention, the function "P" is dynamically variable at different billing periods. If "b" represents the billing period, the price is "$P_b$" for this period. Utilization data from the period "b" is analysed, and the parameters for the next billing period are adjusted and the pricing function $P_{(b+1)}$ is determined for this next billing period. The adjustment to the pricing function dynamically sets the committed amount to a minimum level at which a sufficient percentage of customer requests for resources above the committed amount are satisfied. This optimizes the price for the customer, yet provides sufficient resource availability.

FIG. 1 illustrates a distributed system which implements the present invention. A customer 10 sends requests $R_1$, $R_2$, ... $R_n$ to a resource provider 12 during a billing period. In response, the resource provider 12 supplies resources $U_1$, $U_2$, ... $U_n$ to the customer. During the same billing period, the resource provider 12 sends the resource consumption samples along with the corresponding resource requests to a contract optimization program 18 within contract optimization computer 14 to determine the best minimum value $C_i$ to be used. Computer 14 also includes a CPU 15, operating system 17, RAM 19, ROM 21 and storage 23. The contract optimization program 18 computes the value $U=M(U_1, U_2, ... U_n)$ for this billing period. The contract optimization program 18 passes the value "U" and the minimum value $C_i$ to a billing function 16 which computes the price $P=F(C_i)+G(U-C_i)$ based on this value and the value U. By way of example, the billing function 16 can be a program function within program 18 and execute within computer 14. (Alternately, billing function 16 can be provided by a separate computer.) Finally, the billing function 16 sends a bill with the price "P" to the customer 10.

The contract optimization program 18 within the computer 14 optimizes the pricing function to optimize resource pricing and availability for the customer. As mentioned above, a request $R_i$ can either be fulfilled or denied. A denial of a request can be represented by the following function D(x):

$$D(R_i)=0 \text{ when the request is satisfied } (U_i=R_i)$$

$$D(R_i)=1 \text{ when the request is denied } (U_i<R_i)$$

The contract optimization program 18 determines the percentage of denied requests at the end of the billing period. If "n" is the size of the sample $(U_1, U_2, ... U_n)$, a value D representing such a percentage is as follows:

$$D=\Sigma(R_i)/n$$

The customer can specify an acceptable threshold "T", for example 5%, for the request denial percentage. This threshold depends on the nature of the resource and needs to be agreed with the customer. Below the threshold, the customer will be satisfied from an availability standpoint but perhaps has committed too much resource and is paying too much. Above the threshold, the customer will not be satisfied from an availability standpoint, and the program 18 should increase the committed amount in the contract. The program 18, according to the present invention, adjusts the parameters for the next billing period in order to determine the new pricing function $P_{(b+1)}$, as follows:

1. If D>T

There are too many denials. Consequently, the program 18 needs to increase the committed amount. It is therefore necessary to change $C_i$ into $C_{i+1}$, where $C_{i+1}>C_i$. Thus, the new pricing function for the next billing period will be as follows:

$$P_{(b+1)}=F(C_{i+1})+G(U-C_{i+1})$$

However, if at the same time $K<C_{i+1}$, program 18 will adjust "K" so that $K=C_{i+1}$.

2. If D≦T

From a supply/usage point of view, the customer will be satisfied, but the committed amount may be too high resulting in higher cost to the customer. Therefore, it is beneficial to the customer to determine if the committed amount can be reduced. For this optimization, program 18 uses another function "Da" as follows:

$$Da(R_i)=0 \text{ if } R_i \le C_i-1$$
$$Da(R_i)=1 \text{ if } C_i-1<R_i \le C_i$$
$$Da(R_i)=0 \text{ if } C_i<R_i$$

Then, program 18 determines a new value "Da":

$$Da=\Sigma[Da(R_i)+D(R_i)]/n$$

Then, program 18 compares the new value "Da" to the threshold "T":

If Da≧T, nothing is changed in the contract.

If Da<T, $C_i$ will be changed into $C_i-1$ for the next billing period. This results in reducing the customer bill while maintaining an acceptable level of service. The new pricing function will be as follows:

$$P_{(b+1)}=F(C_i-1)+G(U-C_{i-1})$$

Note that, to avoid "flipping", it is preferable that the above adjustment is performed only when the condition occurs during multiple consecutive billing periods, for example three consecutive billing periods.

Figure 2:
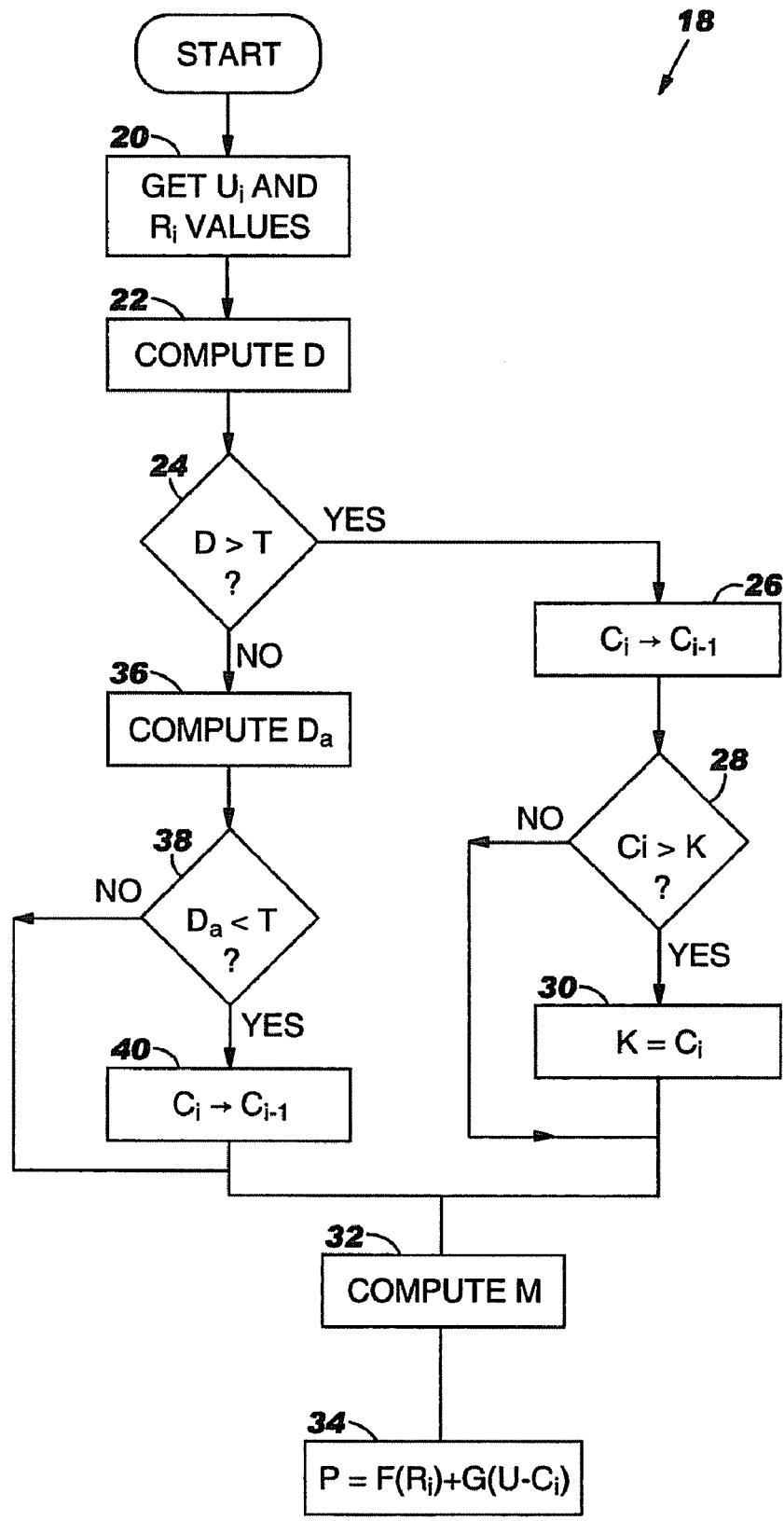
FIG. 2 is a flow chart of a contract optimization program within the system of FIG. 1.

FIG. 2 illustrates in more detail the contract optimization program 18 within the computer 14. The resource provider 12 sends to program 18 the values of the customer requests $R_i$ and the customer consumption amounts $U_i$ (step 20). Next, program 18 computes variable "D" (step 22). Next, program 18 determines whether the value of "D" is greater than the predetermined threshold "T" (step 24). If so, this means there are too many denials and consequently, program 18 replaces the minimum value $C_i$ with the next higher value $C_{i+1}$ (step 26). Next, program 18 checks whether this new value $C_{i+1}$ is greater than the upper contract limit "K" (step 28). If so, program 18 changes "K" to $C_{i+1}$ (step 30). After step 30 or if $C_{i+1}$ is not greater than K, program 18 computes the value "M" (step 32) and then, the price $P=F(R_i)+G(U-C_i)$ of the resource received by the customer during the billing period (step 34).

Refer again to decision 24 where the value "D" is not greater than the threshold "T". This means there are not too many denials. So, program 18 determines the value "Da" (step 36). Next, program 18 determines whether the value "Da" is less than the threshold "T" (step 38). If so, this means not enough requests are above the new minimum value "$C_i$," so program 18 replaces the new minimum value "$C_i$" with the next lower value "$C_{i-1}$" in the list (step 40). After this step or if "Da" is not less than "T", program 18 computes the value "M" (step 32) and determines the price "P" (step 34).

Example

A Company provides the user/customer with Internet access and bills the customer with an invoice based upon the user's bandwidth consumption. The price paid by the customer contains a fixed subscription fee of $5/month. The fixed fee includes a guaranteed or committed bandwidth specified in the contract as "chunks" of 1 Mb/s using the following table:

TABLE 1

| Committed Bandwidth | Price |
| --- | --- |
| $C_1$ = 1 Mb/s | $20 |
| $C_2$ = 2 Mb/s | $38 |
| $C_3$ = 3 Mb/s | $56 |
| $C_4$ = 4 Mb/s | $73 |

In addition, the customer may "burst" over the committed bandwidth that the customer reserved. In such a case, the customer pays for the extra consumption at the following rate:

TABLE 2

| Extra bandwidth | Price |
|---|---|
| 1 Mb/s | $10 |
| 2 Mb/s | $20 |
| 3 Mb/s | $28 |
| 4 Mb/s | $35 |

The billing period is one month. Additionally, the customer defines in the contract an absolute maximum consumption above which the customer cannot obtain. If the customer chooses a contract for a committed bandwidth of 2 Mb/s, then the parameter $C_i$ to be used is $C_2$=2 Mb/s according to Table 1 and the function $F(C_i)$ has the value:

$$F(2)=\$5+\$38=\$43$$

The "G" function is given by Table 2. Assuming that at the end of the month, the user bursted to 4 Mb/s (that is 2 Mb/s over the reserved rate), the function "G" is:

$$G(U - C_i) = G(4 - 2) = G(2) = \$20$$

Finally, the total bill is as follows:

$$P = \$43 + \$20 = \$63$$

As described above, "U" is the result of the computation of the "M" function over the samples collected during the billing period. A known method for the determination of "M" is to use the 95th percentile. Thus, from the samples ($U_1, U_2, \ldots U_n$), the 5% of the higher values are removed and the maximum value amongst the remaining ones is taken. The upper rate that sets the upper limit is the "K" parameter. If the customer limits the total bandwidth to 4 Mb/s, "K" must be 4 Mb/s. Therefore, the bill of $63 is the maximum the customer will pay for any month.

Note that, as explained above, the pricing of the contract is determined by the functions "F" and "G", the choice of the "$C_i$" value and the "K" upper limit. For a given resource, functions "F" and "G" are defined. The customer selects "$C_i$" and "K" when the customer signs the contract. Changing the contract consists of changing the choice for "$C_i$" and "K". Rather than fixing once and for all the "$C_i$" and "K" values, the customer agrees with the provider to a service level agreement where at most "T" percent of the request may be denied. Assume that the customer agrees to T=10%. If the average request denial "D" over the billing period is above 10%, this means that the current contract does not meet the service level agreement. The customer uses the burst bandwidth, which is cheaper, to satisfy the customer's needs. However, as this portion is not guaranteed, the requests may be denied. In this example, too many requests are denied compared to the requested service level. Therefore, $C_2$=(2 Mb/s) is replaced by $C_3$=(3 Mb/s). The new price becomes for the next billing period:

$$P=F(3)+G(U-3)$$

If during the next billing period, $D \leq T$, nothing is changed. However, if this is not the case, $C_3$=(3 Mb/s) is replaced by $C_4$=(4 Mb/s). Assuming that the increase of load is only temporary, it is useful to compute the value Da, which is the percentage of the requests being just above the preceding value, here $C_3$. If Da<T, then $C_4$=(4 Mb/s) is changed again into $C_3$=(3 Mb/s) which is a convenient value to assure the required demand.

Program 18 can be loaded into computer 14 via a computer readable medium 25 such as a magnetic, optical or DVD disk or be downloaded via the Internet 27.

The invention claimed is:

1. A computer program product for determining a price to bill a customer for a resource, said computer program product comprising:
   a computer readable tangible storage device;
   first program instructions for identifying an amount $C_i$ of the resource committed to the customer during a first billing period;
   second program instructions for determining a price $P_i$ for the first billing period according to $P_i=F(C_i)+G(U_F-C_i)$, wherein $U_F$ is an amount of the resource provided to the customer during the first billing period;
   third program instructions for billing the price $P_i$ to the customer for the first billing period;
   fourth program instructions for determining a number of denied requests D consisting of a number of requests for the resource which were made by the customer during the first billing period for an amount of the resource in excess of $C_i$ and were denied;
   fifth program instructions for determining that the number of denied requests D exceeds a predetermined threshold;
   sixth program instructions for, in response to the fifth program instructions having determined that the number of denied requests D exceeds the predetermined threshold, increasing the amount $C_i$ to an amount $C_{i+1}$ of the resource committed to the customer during a second billing period subsequent to the first billing period;
   sixth program instructions for determining a price $P_{i+1}$ to the customer for the second period according to $P_{i+1}=F(C_{i+1})+G(U_S-C_{i+1})$, wherein $U_S$ is an amount of the resource provided to the customer during the second billing period; and
   seventh program instructions for billing the price $P_{i+1}$ to the customer for the second billing period, wherein F(C) is a monotonically increasing function of C, wherein G(U−C) is a monotonically increasing function of U−C, wherein C denotes an amount of the resource committed to the customer during any billing period, and wherein U denotes an amount of the resource provided to the customer during said any billing period,
   wherein the first program instructions, the second program instructions, the third program instructions, the fourth program instructions, the fifth program instructions, the sixth program instructions, and the seventh program instructions are stored on the computer readable tangible storage device.

2. The computer program product of claim 1, wherein the computer program product further comprises:
   eighth program instructions for computing $U_F$ and $U_S$ according to $U=M(U_1, U_2, \ldots, U_n)$, wherein denotes a sample value corresponding to real consumption of the resource at sample interval j during the first billing period for j=1, 2, ..., n, wherein U denotes $U_F$ or $U_S$, for the first billing period or the second billing period, respectively, wherein M is a function of $U_1, U_2, \ldots, U_n$, wherein n is a total number of sample intervals, and wherein the eighth program instructions are stored on the computer readable tangible storage device.

3. The computer program product of claim 2, wherein $M(U_1, U_2, \ldots, U_n)$ denotes an average of the sample values $U_1, U_2 \ldots U_n$.

4. The computer program product of claim 2, wherein $M(U_1, U_2, \ldots, U_n)$ denotes a sum of the sample values $U_1, U_2 \ldots U_n$.

5. The computer program product of claim 2, wherein $M(U_1, U_2, \ldots, U_n$ denotes a 95th percentile value of the sample values $U_1, U_2 \ldots U_n$.

6. The computer program product of claim 2, wherein said fourth program instructions for determining the number of denied requests D comprises instructions for computing D according to $D=\Sigma_j D(R_j)/n$, where $R_j$ is an amount of the resource requested by the customer for the sample interval j for $j=1, 2, \ldots, n$, wherein $D(R_j)=0$ and $U_j=R_j$ if the amount requested $R_j$ is satisfied, and wherein $D(R_j)=1$ and $U_j<R_j$ if the amount requested $R_j$ is denied, and wherein $\Sigma_j$ denotes a summation over j from $j=1$ to $j=n$.

7. The computer program product of claim 1, wherein $C_i$ has been selected by a provider of the resource from a set of predetermined discrete values and appears in a contract between the customer and the provider of the resource.

8. The computer program product of claim 7, wherein said sixth program instructions for increasing the amount $C_i$ to the amount $C_{i+1}$ comprises instructions for selecting $C_{i+1}$ from the set of predetermined discrete values as a next higher discrete value after $C_i$ in the set of predetermined discrete values.

9. The computer program product of claim 1, said computer program product further comprising:
   eighth program instructions for setting a maximum amount of utilization K of the resource permitted to the customer as specified in a contract between the customer and a provider of the resource;
   ninth program instructions for limiting consumption of the resource by the customer to K during the first billing period;
   tenth program instructions for determining that $C_{i+1}$ is greater than K; and
   eleventh program instructions for, in response to the tenth program instructions having determined that $C_{i+1}$ is greater than K, replacing the maximum amount of utilization K with $C_{i+1}$ for the second billing period,
   wherein the eighth program instructions, the ninth program instructions, the tenth program instructions, and the eleventh program instructions are stored on the computer readable tangible storage device.

10. A computer program product for determining a price to bill a customer for a resource, said computer program product comprising:
   a computer readable tangible storage device;
   first program instructions for identifying an amount $C_i$ of the resource committed to the customer during a first billing period;
   second program instructions for determining a price $P_i$ for the first billing period according to $P_i=F(C_i)+G(U_F-C_i)$, wherein $U_F$ is an amount of the resource provided to the customer during the first billing period;
   third program instructions for billing the price $P_i$ to the customer for the first billing period;
   fourth program instructions for determining that the customer requested less resource than $C_i$ during the first billing period;
   fifth program instructions for, in response to said determining that the customer requested less resource than $C_i$ during the first billing period, decreasing the amount $C_i$ to an amount $C_{i+1}$ of the resource committed to the customer during a second billing period subsequent to the first billing period;
   sixth program instructions for determining a price $P_{i+1}$ to the customer for the second period according to $P_{i+1}=F(C_{i+1})+G(U_S-C_{i+1})$, wherein $U_S$ is an amount of the resource provided to the customer during the second billing period; and
   seventh program instructions for billing the price $P_{i+1}$ to the customer for the second billing period, wherein $F(C)$ is a monotonically increasing function of C, wherein $G(U-C)$ is a monotonically increasing function of $U-C$, wherein C denotes an amount of the resource committed to the customer during any billing period, and wherein U denotes an amount of the resource provided to the customer during said any billing period,
   wherein the first program instructions, the second program instructions, the third program instructions, the fourth program instructions, the fifth program instructions, the sixth program instructions, and the seventh program instructions are stored on the computer readable tangible storage device.

11. A computer system for determining a price to bill a customer for a resource, said computer system comprising:
   a processor;
   a computer readable memory;
   a computer readable tangible storage device;
   first program instructions for identifying an amount $C_i$ of the resource committed to the customer during a first billing period;
   second program instructions for determining a price $P_i$ for the first billing period according to $P_i=F(C_i)+G(U_F-C_i)$, wherein $U_F$ is an amount of the resource provided to the customer during the first billing period;
   third program instructions for billing the price $P_i$ to the customer for the first billing period;
   fourth program instructions for determining a number of denied requests D consisting of a number of requests for the resource which were made by the customer during the first billing period for an amount of the resource in excess of $C_i$ and were denied;
   fifth program instructions for determining that the number of denied requests D exceeds a predetermined threshold;
   sixth program instructions for, in response to the fifth program instructions having determined that the number of denied requests D exceeds the predetermined threshold, increasing the amount $C_i$ to an amount $C_{i+1}$ of the resource committed to the customer during a second billing period subsequent to the first billing period;
   sixth program instructions for determining a price $P_{i+1}$ to the customer for the second period according to $P_{i+1}=F(C_{i+1})+G(U_S-C_{i+1})$, wherein $U_S$ is an amount of the resource provided to the customer during the second billing period; and
   seventh program instructions for billing the price $P_{i+1}$ to the customer for the second billing period, wherein $F(C)$ is a monotonically increasing function of C, wherein $G(U-C)$ is a monotonically increasing function of $U-C$, wherein C denotes an amount of the resource committed to the customer during any billing period, and wherein U denotes an amount of the resource provided to the customer during said any billing period.
   wherein the first program instructions, the second program instructions, the third program instructions, the fourth program instructions, the fifth program instructions, the sixth program instructions, and the seventh program instructions are stored on the computer readable tangible storage device for execution by the processor via the computer readable memory.

12. The computer system of claim 11, wherein the computer system further comprises:
   eighth program instructions for computing $U_F$ and $U_S$ according to $U=M(U_1, U_2, \ldots, U_n)$, wherein $U_j$ denotes a sample value corresponding to real consumption of the resource at sample interval j during the first billing period for $j=1, 2, \ldots, n$, wherein U denotes $U_F$ or $U_S$, for the first billing period or the second billing period, respectively, wherein M is a function of $U_1, U_2, \ldots, U_n$, wherein n is a total number of sample intervals, and wherein the eighth program instructions are stored on the computer readable tangible storage device for execution by the processor via the computer readable memory.

13. The computer system of claim 12, wherein $M(U_1, U_2, \ldots, U_n)$, denotes an average of the sample values $U_1, U_2 \ldots U_n$.

14. The computer system of claim 12, wherein $M(U_1, U_2, \ldots, U_n)$, denotes a sum of the sample values $U_1, U_2 \ldots U_n$.

15. The computer system of claim 12, wherein $M(U_1, U_2, \ldots, U_n)$, denotes a 95th percentile value of the sample values $U_1, U_2 \ldots U_n$.

16. The computer system of claim 12, wherein said fourth program instructions for determining the number of denied requests D comprises instructions for computing D according to $D=\Sigma_j D(R_j)/n$, where $R_j$ is an amount of the resource requested by the customer for the sample interval j for $j=1, 2, \ldots, n$, wherein $D(R_j)=0$ and $=R_j$ if the amount requested $R_j$ is satisfied, and wherein $D(R_j)=1$ and $<R_j$ if the amount requested $R_j$ is denied, and wherein $\Sigma_j$ denotes a summation over j from j=1 to j=n.

17. The computer system of claim 11, wherein $C_i$ has been selected by a provider of the resource from a set of predetermined discrete values and appears in a contract between the customer and the provider of the resource.

18. The computer system of claim 17, wherein said sixth program instructions for increasing the amount $C_i$ to the amount $C_{i+1}$ comprises instructions for selecting $C_{i+1}$ from the set of predetermined discrete values as a next higher discrete value after $C_i$ in the set of predetermined discrete values.

19. The computer system of claim 11, said computer system further comprising:
   eighth program instructions for setting a maximum amount of utilization K of the resource permitted to the customer as specified in a contract between the customer and a provider of the resource;
   ninth program instructions for limiting consumption of the resource by the customer to K during the first billing period;
   tenth program instructions for determining that $C_{i+1}$ is greater than K; and
   eleventh program instructions for, in response to the tenth program instructions having determined that $C_{i+1}$ is greater than K, replacing the maximum amount of utilization K with $C_{i+1}$ for the second billing period,
   wherein the eighth program instructions, the ninth program instructions, the tenth program instructions, and the eleventh program instructions are stored on the computer readable tangible storage device for execution by the processor via the computer readable memory.

20. A computer system for determining a price to bill a customer for a resource, said computer system comprising:
   a processor;
   a computer readable memory;
   a computer readable tangible storage device;
   first program instructions for identifying an amount $C_i$ of the resource committed to the customer during a first billing period;
   second program instructions for determining a price $P_i$ for the first billing period according to $P_i=F(C_i)+G(U_F-C_i)$, wherein $U_F$ is an amount of the resource provided to the customer during the first billing period;
   third program instructions for billing the price $P_i$ to the customer for the first billing period;
   fourth program instructions for determining that the customer requested less resource than $C_i$ during the first billing period;
   fifth program instructions for, in response to said determining that the customer requested less resource than $C_i$ during the first billing period, decreasing the amount $C_i$ to an amount $C_{i+1}$ of the resource committed to the customer during a second billing period subsequent to the first billing period;
   sixth program instructions for determining a price $P_{i+1}$ to the customer for the second period according to $P_{i+1}=F(C_{i+1})+G(U_S-C_{i+1})$, wherein $U_S$ is an amount of the resource provided to the customer during the second billing period; and
   seventh program instructions for billing the price $P_{i+1}$ to the customer for the second billing period, wherein F(C) is a monotonically increasing function of C, wherein G(U−C) is a monotonically increasing function of U−C, wherein C denotes an amount of the resource committed to the customer during any billing period, and wherein U denotes an amount of the resource provided to the customer during said any billing period,
   wherein the first program instructions, the second program instructions, the third program instructions, the fourth program instructions, the fifth program instructions, the sixth program instructions, and the seventh program instructions are stored on the computer readable tangible storage device for execution by the processor via the computer readable memory.

* * * * *